April 7, 1931. J. ZWICKY 1,799,998
STRAINER OR FILTER, PARTICULARLY FOR PETROL FILLING NOZZLES
Filed July 5, 1927 2 Sheets-Sheet 1
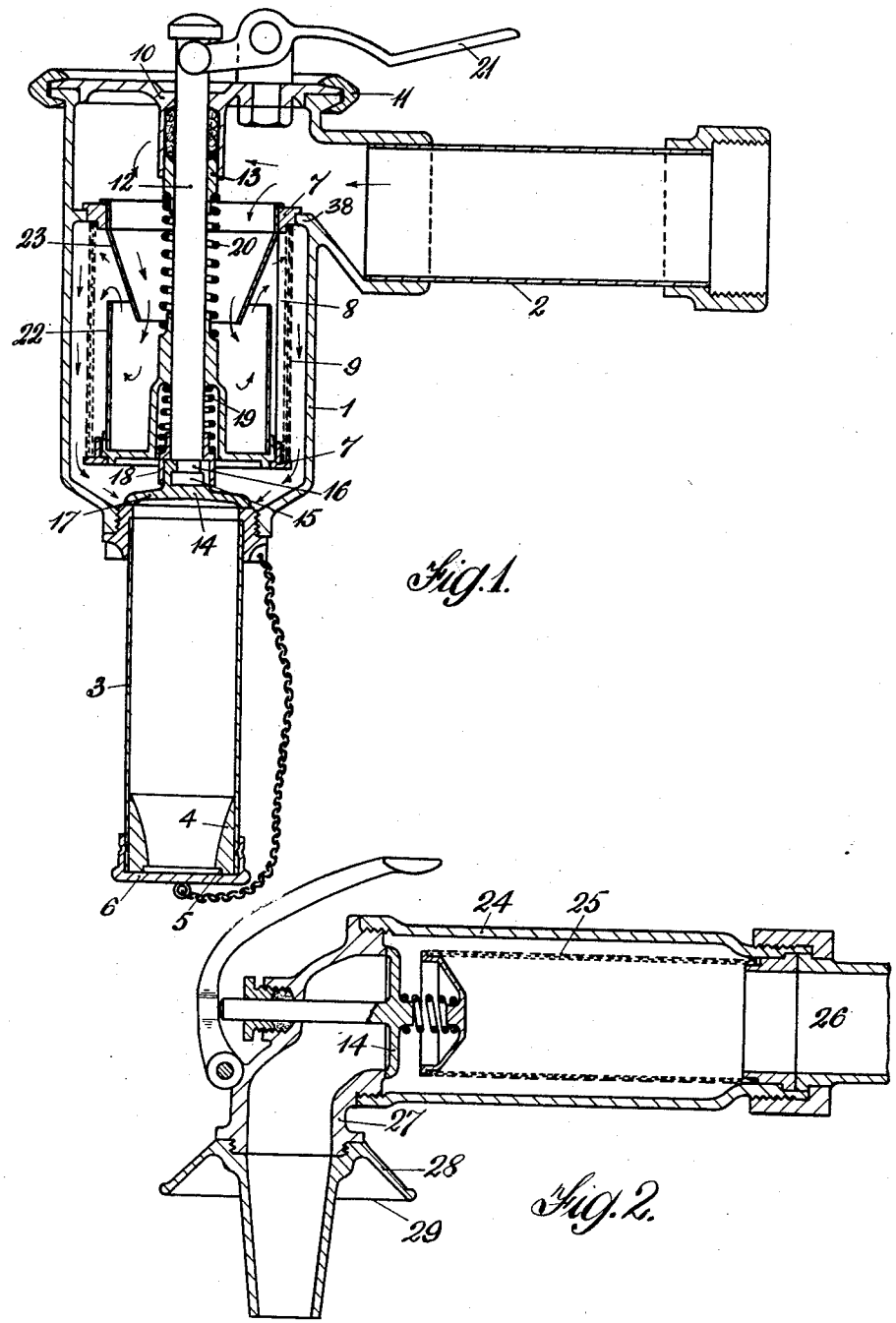

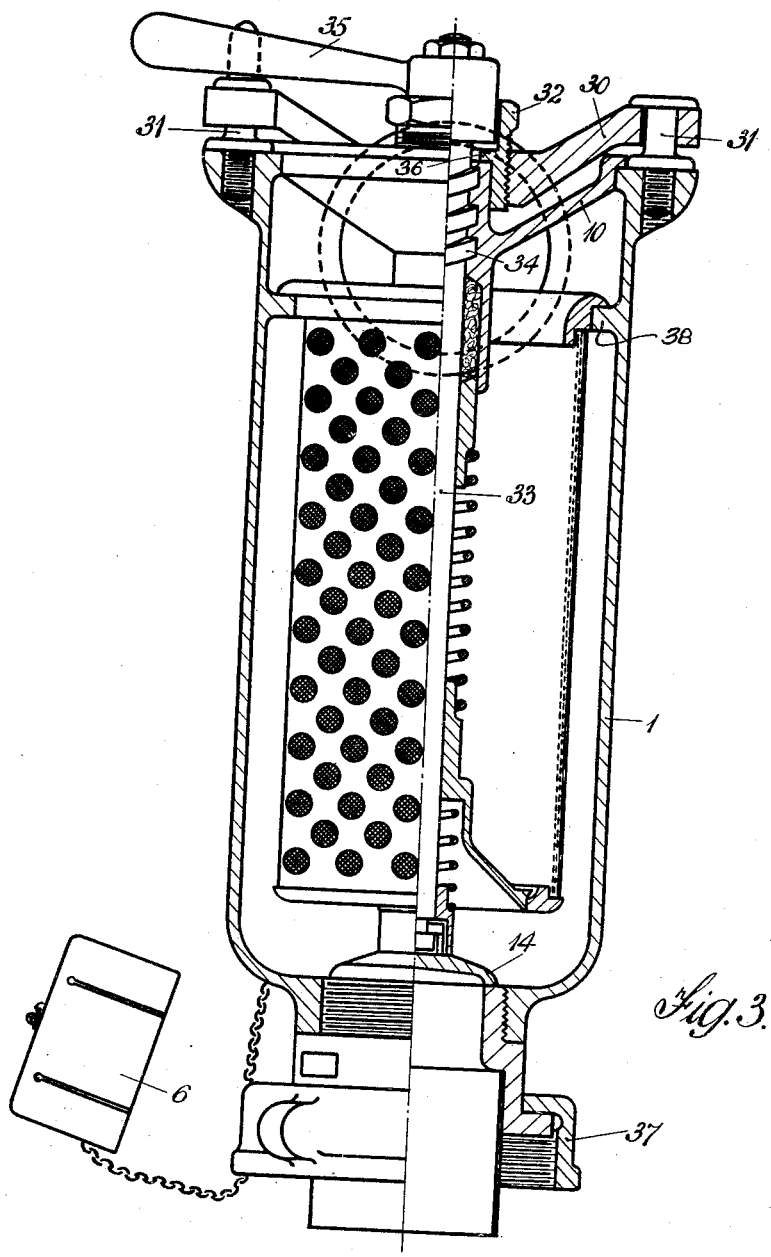

Patented Apr. 7, 1931

1,799,998

UNITED STATES PATENT OFFICE

JEAN ZWICKY, OF FARNHAM ROYAL, ENGLAND

STRAINER OR FILTER, PARTICULARLY FOR PETROL FILLING NOZZLES

Application filed July 5, 1927, Serial No. 203,662, and in Great Britain July 6, 1926.

This invention relates to filling nozzles employed, commonly at the end of a length of flexible hose, for supplying gasoline to the tanks of motor vehicles, air craft and so forth. The object of the invention is a filling nozzle equipped with a filter and a valve, the filter being removable for cleaning or replacement when necessary. The invention includes constructions of filter and filter body or casing, and dispositions of inlet, outlet, valve, valve operating means and filter, enabling the filter effectively to remove all solid matter from the gasoline without undue obstruction of the flow, facilitating the removal of the filter, and protecting the valve. These and other features of the invention will appear from the embodiments described below, and are defined in the appended claims.

In the drawings Figure 1, 2, and 3 are axial sections through different forms of filling nozzles, Figure 2 being diagrammatic.

Each filling nozzle comprises a filter body having an inlet adapted for connection to a flexible hose, and an outlet or delivery adapted for connection to or insertion in a tank, a removable filter making joint with the body, and a poppet valve normally closing the outlet.

In the construction of Figure 1 there is a cylindrical filter body 1, with an inlet tube 2 at right angles to it forming a handle, and a delivery tube 3 coaxial with it. The mouth of the delivery tube is made smoothly convergent and the lip is cut back as indicated at 4 and 5 respectively to give a smooth flow. When not in use the tube 3 is closed by a cap 6 sprung on to it.

In the filter body is a filter or straining member which in all the constructions consists of a skeleton frame upon which are stretched sheets of perforated metal, and wire gauze of progressively finer mesh. In Figure 1 the skeleton frame comprises end rings 7 joined by longitudinal bars such as 8 around which are the layers 9 of perforated metal and gauze. The upper ring 7 fits within and upon the shoulder 38 of the body 1 intermediate between the inlet tube 2 and the delivery 3. The filter body is closed at the upper end by a plate 10 secured by a ring 11 which is divided and the two halves hinged together at one end and drawn together at the other by a bolt, the ring having a bevelled groove fitting the bevelled flanges of the filter body and end plate. The lower end of the skeleton frame is also closed. A valve stem 12 is guided in the gland 13 of a stuffing box in the end plate 10 and in the bottom of the frame and carries at its lower end a valve 14 seating upon the outlet. The valve stem has an enlarged end 15 and is reduced at 16 adjacent the end, and these parts are entered laterally into a boss 17 upon the valve. A sleeve 18 secures the parts in position and is itself held upon them by the spring 19 which presses the valve on its the spring 19 which presses the valve on its seating. Another spring 20 serves on the one hand to take up wear in the gland 13 and on the other hand to press the frame 7, 8 down upon the body 1. The valve is lifted from its seating by a lever 21 pivoted on the end plate 10 conveniently adjacent to the handle 2. A partition wall 22 erected upon the closed end of the filter frame forms a collecting chamber, and a cone 23 entering this chamber directs the gasoline downward into it, necessitating its reversing its direction of motion to escape between the cone and the wall 2. The result of this construction is to cause the deposit of the coarser impurities in the collecting chamber, and so delay the choking of the filter.

In the construction of Figure 2 the filter body 24 and filter 25 are coaxial with the inlet 26, while the outlet 27 is bent at an angle. In this construction the filter body forms the handle, and the valve is operated by a bent lever. To prevent ingress of rain while permitting egress of air the outlet 27 is fitted with a cone deflector 28 having webs 29 which rest upon the flange of the tank.

In Figure 3 the end plate 10 is fastened by a bridge piece 30 which swings upon one of the studs 31 and when in position engages beneath the head of the other. An abutment 32 screws into a central boss on the bridge piece and bears upon the end plate, forcing it upon the filter body and pressing the bridge piece against the heads of the studs. The stem 33 of the valve 14 has a quick thread 34 at its upper end, and the boss of the end plate 10 is similarly threaded; the valve is opened by turning the handle 35. Preferably the abutment 32 is so engaged with the end plate as to withdraw it when unscrewed as well as press it into place when screwed in; for instance it may have an internal flange 36 engaged between the boss of the end plate and the valve operating handle.

In lieu of the delivery tube 3 the nozzle of Figure 3 is shown as fitted with an adapter 37 for making a screw connection with the flange of a petrol tank.

I claim:

1. A filling nozzle comprising a cylindrical body having a lateral inlet near one end and an outlet coaxial with the body at the other, a shoulder in said body adjacent said inlet, a removable end plate on said body at the end remote from the outlet, a stuffing box and gland in said end plate, a filter seating upon said shoulder, a spring compressed between said filter and said gland, and a valve seating upon said outlet and having a stem extending through said gland.

2. A filling nozzle comprising a cylindrical body, a removable end plate closing one end of said body and containing a gland, an inlet adjacent said end plate, a shoulder on the body, a cylindrical filter having an end ring at one end seating upon said shoulder and closed at the other end, a valve stem passing through said gland and said closed end of the filter, a valve loose upon said stem seating upon the other end of said body, means holding said filter upon said shoulder, and a spring compressed between the closed end of said filter and said valve and pressing said valve upon its seating.

3. A filling nozzle comprising a cylindrical body, a removable end plate closing one end of said body and containing a gland, an inlet adjacent said end plate, a shoulder on the body, a cylindrical filter having an end ring at one end seating upon said shoulder and closed at the other end, a valve stem passing through said gland, a valve upon said stem closing the other end of said body, a spring compressed between said gland and said closed end of the filter compressing said gland and holding said filter upon its shoulder, and a second spring compressed between said closed end of the filter and the valve, and pressing the valve upon its seating.

4. A filling nozzle comprising a cylindrical body with a concentric outlet at one end and a lateral inlet at the other, a removable end plate closing the inlet end of said body and containing a gland, a shoulder in said body between the inlet and the outlet, a cylindrical filter closed at one end and having an end ring at the other seating upon said shoulder, a valve stem passing through said gland and the closed end of the filter, a valve loose upon said stem seating upon the outlet, a spring compressed between said gland and the closed end of said filter, a second spring compressed between said closed end of the filter and said valve, and means for lifting said valve against the action of its spring.

5. A filling nozzle comprising a cylindrical body having an inlet and outlet, a shoulder on the body adjacent said inlet, a cylindrical filter having an end ring at one end seating upon and making joint with said shoulder and closed at the other end, means tending to hold said filter upon said shoulder, a valve stem co-axial with said filter, a valve on said stem seating upon the outlet, and a spring compressed between said valve and the adjacent closed end of said filter and pressing said valve upon its seating.

In testimony whereof, I have signed my name to this specification.

JEAN ZWICKY.